United States Patent [19]
Baird et al.

[11] Patent Number: 5,353,358
[45] Date of Patent: Oct. 4, 1994

[54] METHOD FOR DETERMINING ARTICLE ORIENTATION IN AN ARTICLE HANDLING SYSTEM USING A SAMPLING OF A CCD ARRAY

[75] Inventors: Randy K. Baird, Bolivar; Stanley P. Turcheck, Jr., Homer City, both of Pa.

[73] Assignee: FMC Corporation, Chicago, Ill.

[21] Appl. No.: 90,443

[22] Filed: Jul. 12, 1993

Related U.S. Application Data

[63] Continuation of Ser. No. 586,939, Sep. 24, 1990, abandoned.

[51] Int. Cl.$^5$ .................... G06K 9/62; G01B 11/00
[52] U.S. Cl. ............................. 382/8; 382/14; 364/559; 348/94; 348/91
[58] Field of Search ............... 382/1, 8, 15, 14; 356/394; 209/577, 586; 364/559; 358/101

[56] References Cited

U.S. PATENT DOCUMENTS

| | | | |
|---|---|---|---|
| 4,017,721 | 4/1977 | Michaud | 358/107 |
| 4,441,205 | 4/1984 | Berkin et al. | 382/14 |
| 4,630,225 | 12/1986 | Hisano | 382/8 |
| 4,690,284 | 9/1987 | Buckley et al. | 209/590 |
| 4,711,579 | 12/1987 | Wilkinson | 356/394 |
| 4,784,493 | 11/1988 | Turcheck et al. | 364/559 |
| 4,965,842 | 10/1990 | Crossley et al. | 382/8 |
| 4,984,075 | 1/1991 | Munaoka | 382/8 |
| 5,007,097 | 4/1991 | Mizuoka et al. | 382/8 |
| 5,103,304 | 4/1992 | Turcheck, Jr. et al. | 358/101 |

FOREIGN PATENT DOCUMENTS

| | | |
|---|---|---|
| 0067438 | 12/1982 | European Pat. Off. . |
| 0127445 | 12/1984 | European Pat. Off. . |
| 2140603 | 4/1987 | United Kingdom . |

*Primary Examiner*—Leo H. Boudreau
*Assistant Examiner*—Larry J. Prikockis
*Attorney, Agent, or Firm*—Douglas W. Rudy; Richard B. Megley

[57] ABSTRACT

In an article handling system that functions to make article discrimination-identification determinations, the possible article orientations A, B, C . . . are stored and compared to establish maximum pixel difference numbers and identification of longitudinal window position along the article where such maximum difference occurs. Each of the possible orientations is compared with all other possible orientations so that a small number of windows is identified as part of a setting procedure. When operating, the work articles are scanned and only the data at window locations are used to make article orientation identifications to reduce time and memory requirements for data processing.

5 Claims, 3 Drawing Sheets

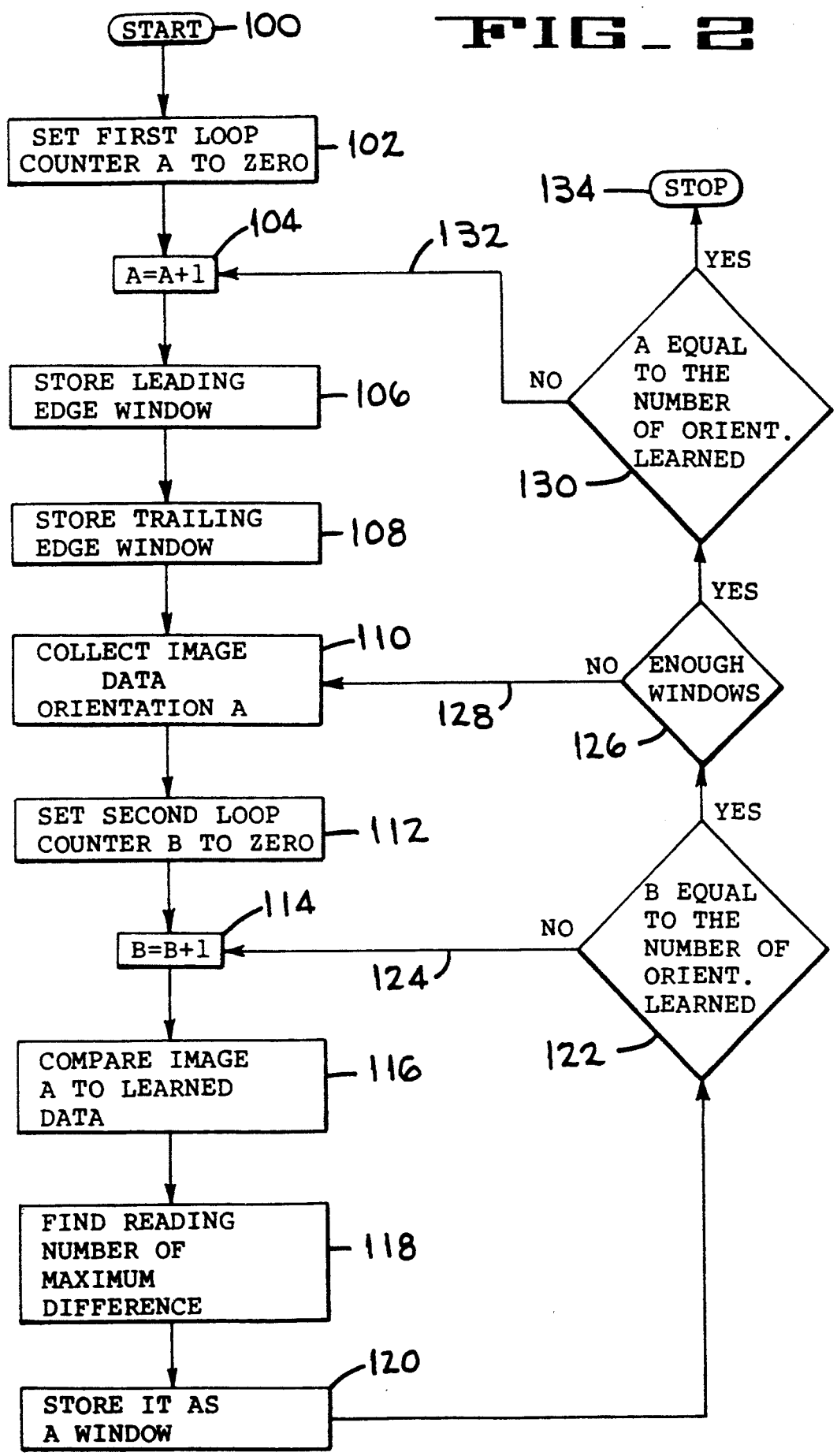

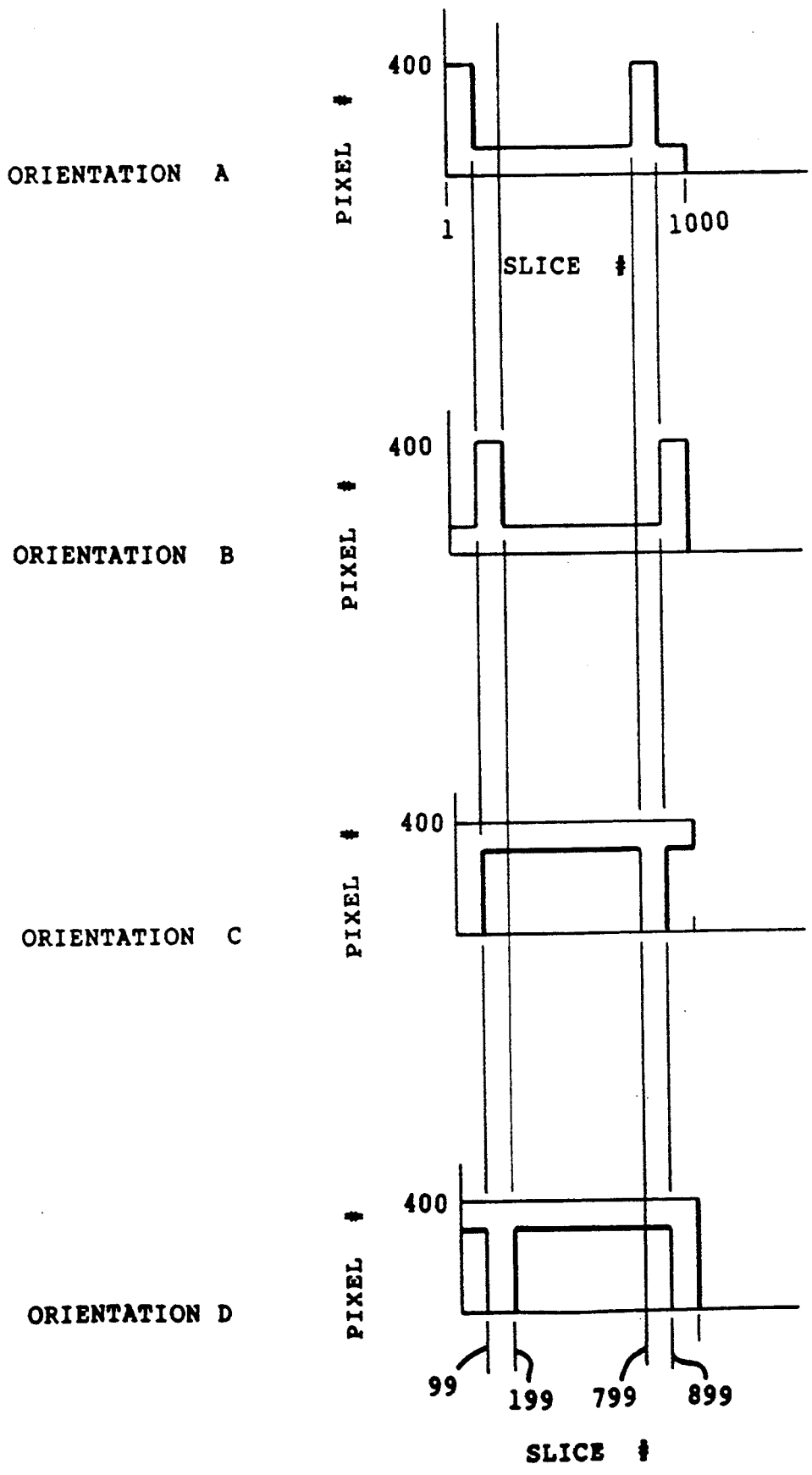

METHOD FOR DETERMINING ARTICLE ORIENTATION IN AN ARTICLE HANDLING SYSTEM USING A SAMPLING OF A CCD ARRAY

This application is a continuation of application Ser. No. 07/586,939, filed Sep. 24, 1990, now abandoned.

This invention relates to the determination of article orientation in an article handling system, and more particularly relates to a procedure for locating positions along the length of an article where maximum differences occur depending upon article orientation.

BACKGROUND

In Turcheck et al, U.S. Pat. No. 4,784,493, an apparatus and method are disclosed for recognition of an article and its orientation on a conveyor. To determine orientation of a work article, a number of possible orientations are first recorded as a preliminary procedure in a memory. All of the data stored in the memory for each orientation is then compared with data scanned the work article as it moves along a conveyor path. Orientation of the work article is determined by matching the compared data.

The time required for making such article orientation determinations restricts the number of articles that can be processed in a unit of time. Such restriction may be the limiting factor of a production line. Prior efforts at reducing data processing time have included human operator participation in manually selecting partial areas along the article length which will be examined by use of a computer keyboard, mouse or the like. This requires a skill level not always present in the work environment and re-selecting procedures must be undertaken each time there is a change in the article being processed.

SUMMARY OF INVENTION

It is an object of this invention to reduce the processing time for determining article orientation by using only a portion of the object for comparison with stored data where the portion is selected automatically without requiring a skilled operator.

Another object is to provide a novel method of selecting a few spaced windows along the article length which are effective in making orientation determinations.

In accordance with one feature of the invention, stored article information data in one orientation is compared with the corresponding data for a second orientation and a point of maximum difference in the edge point profile information is calculated. The position of the edge point having the maximum difference is recorded as a window. Thereafter, in real time, the profile information data from a work article is examined only at that window to determine whether the difference is zero or a value and therefore the orientation of the article.

Where the articles have several possible orientations, the setting procedure can involve the stored information orientation data for each orientation with each other possible orientation so that several windows are determined, one for each different comparison. In the case of four possible orientations, there will be three windows for each of the four orientations which can result in twelve windows in the event each window is at a different longitudinal position along the article. When a work article is to be examined in real time, the orientation is determined by examining the data only at the window positions and is recognized by a total score that is the lowest. Other advantages and features of the invention will become apparent from the claims and from the description as it proceeds in conjunction with the drawings.

BRIEF DESCRIPTION OF DRAWINGS

FIG. 2 is a flow diagram of a procedure for generating windows; and

FIG. 3 is a pictorial view of four possible orientations of the object whose orientation is to be identified.

DETAILED DESCRIPTION OF PREFERRED EMBODIMENTS

Figure 1:
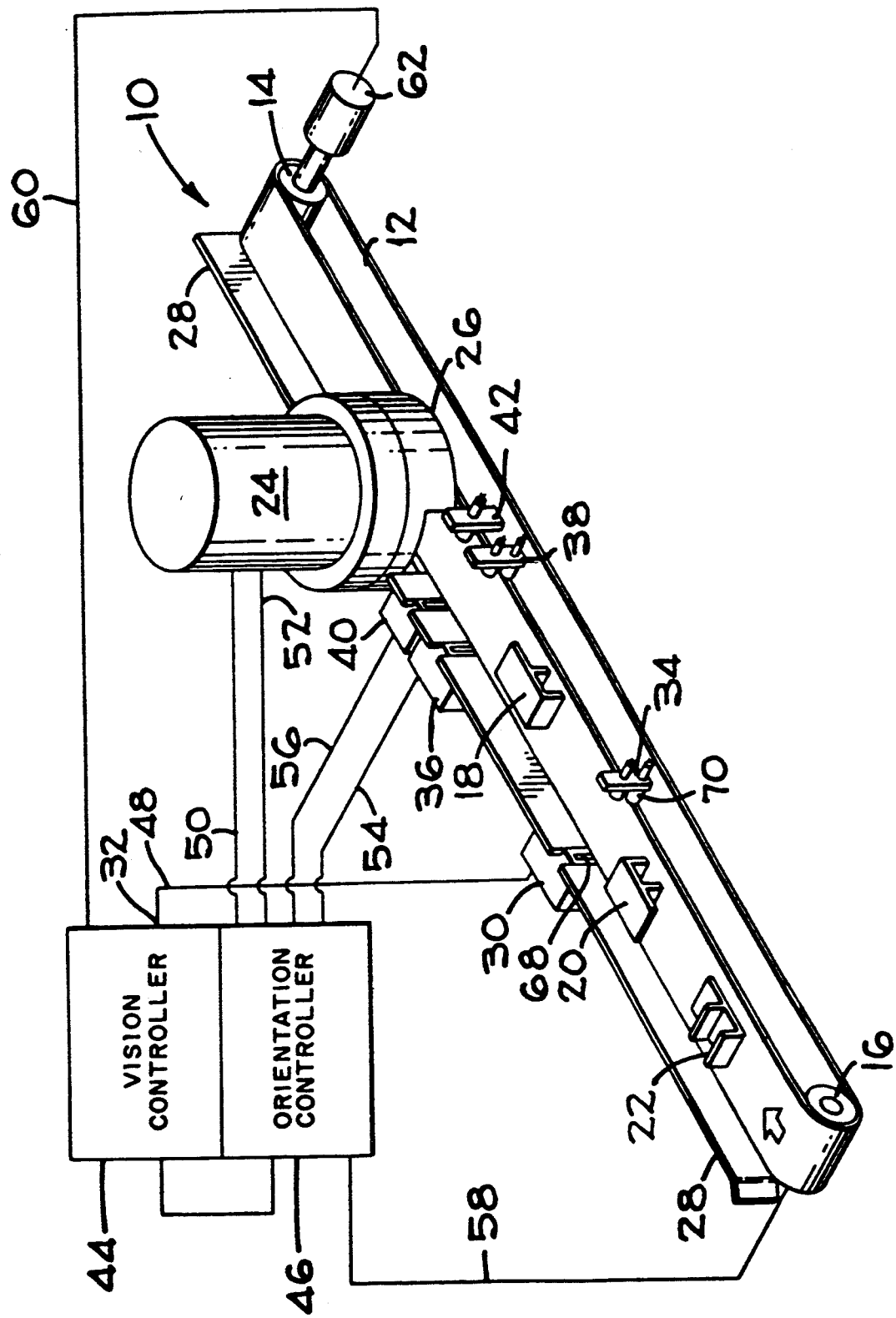
FIG. 1 is a pictorial view of a conveyor system having an article diverter.

The present invention will be described as a feature that is adapted for use with the article or part recognition and orientation system disclosed in Turcheck et al U.S. Pat. No. 4,784,493. The general environment of the reorientor is diagrammatically illustrated in FIG. 1. The reorientor system may generally comprise a frame supported continuous belt 12 entrained around a driver roll 14 and a idler roll 16. Work pieces such as 18, 20, and 22 are similar parts having three different orientations. The simplest form of reorientor is shown in this figure, that being a stepping motor driven single axis (Y-axis) reorientor having a lower chamber 26 that can be rotated 180 degrees. Other orientors including multiple position reorientors are known in the art and may be advantageously used with the present invention.

Adjacent the continuous belt 12 at one edge thereof is a fence 28 running the length of the belt but having several breaks therein. On the inbound side of the reorientor means 24 there is a first break in the fence to accommodate a recognition sensor 30 which may be a 16×1 array of vertically stacked fiber optic elements connected to 16 individual phototransistors each having a hard wired connection to a vision controller or microprocessor input port 32. An infrared light source 34 composed of dual infrared LEDs adjusted to different angles is directly across the belt from the recognition sensor 30 and provides the necessary illumination to switch the phototransistors related to each of the 16 fiber optic filaments depending upon whether the individual filament is illuminated or shadowed by the work article.

Alternatively, the linear array of sensors may comprise a column of CCD units which provide a pixel density of between about 1000 and 4000 pixels per inch and preferably about 2000 pixels per inch thereby to provide a high resolution sensor. The CCD units are scanned at a frequency between about 1 MHz and 40 MHz and preferably about 10 MHz to produce an analog signal that is digitized and converted to a count value as disclosed in copending application Ser. No. 046,888, filed May 17, 1994, now U.S. Pat. No. 5,311,977 and Ser. No. 586,167, filed Sep. 21, 1990, now U.S. Pat. No. 5,157,486, the disclosures of which are hereby incorporated by reference. Hardware compaction of data applied to the microprocessor allows for improved image resolution to be obtained while reducing the processing time and memory size requirements. The present invention is equally usable with the systems disclosed in those applications.

The second break in fence 28 is provided to accommodate a first infrared thru beam optical switch composed of a receiver 36 and a light source 38.

Immediately prior to the entry port of the orientor means 24 there may be optionally positioned at a third break in the fence 28, a second infrared thru beam optical switch means having a receiver 40 and a light source 42.

The recognition sensor communicates via a conduit line 48 with a vision controller 44 which in turn is in communication with an orientation controller 46.

Vision controller 44 is hard wired to the work article sensors 30 while the orientation controller 36 is wired to the article recognition sensors 36 and 40 and reorientor 24. A signal related to the movement of the conveyor belt is supplied by lead 58 to orientation controller 46. Control and monitoring of the belt speed maybe by shaft encoder 62 which is connected by lead 60 to vision controller 44, since a constant belt speed is important for maintaining image resolution in this embodiment.

The identical sample work pieces 18, 20, and 22 chosen for explanatory purposes of the specification are shown in FIGS. 1 and 3 and comprise a plastic article having a length of about 3 inches provided with a blunt end surface which may be either at the trailing end as shown at 18 in FIG. 1 to provide orientation A or the leading end as is the case for work article 20 to provide orientation B. The work article 22 is shown with a third orientation C. Up to seven orientations may be determined by the program described below.

In operation, work articles 18, 20, and 22 moving along the path or the conveyor belt 12 may be inspected for conformity with a desired and acceptable work piece. In conjunction with such inspection, it is necessary to identify article orientation and make such position changes as are necessary so that all work articles leave the discharge side of the reorientor 24 with the same orientation.

Memory resident in the programmable vision controller 44 is "taught" a plurality of up to seven possible orientations of a work article in a setting procedure prior to the production run. The present invention is especially adapted for reducing the time required for making the determination of the actual orientation of work pieces, or article identification as the case may be.

As explained in the '493 patent, the capacity for data storage in the division controller 44 is sufficient to store information concerning the edge points of an article as it passes scanner 30. The standard recognition device operates in a silhouette mode so that only profile information data is needed. Each scan represents a slice of the article and produces at least one edge point on the profile. The number of slices per article, for example, may be 1000 depending upon conveyor speed, article length and microprocessor programming.

To operate in accordance with the present invention, an article having acceptable dimensions is fed by the conveyor past the array 30 in a first orientation A. This information is stored in a "learn" mode. Typically this procedure is repeated at least once and optionally up to about ten (10) times to obtain an envelope of values or average value for the first orientation.

Next the system is taught to recognize a second orientation B of the same article by the same procedure.

Additional orientations C, D . . . of the same article up to a total of seven (7) different orientations can be processed by the system of the prior '493 patent. When all of the required orientations are taught, i.e. stored in vision controller memory 44, the system is advanced from the "learn" mode to a "windows generation" mode before moving on to an "operation" mode allowing the repetitive feeding of work articles. Since the conveyor belt speed is carefully controlled, once the article leading edge has been detected, information data for corresponding points that are acquired by successive slice scanning can be identified by slices numbered between one and 1000 in the illustrated example. The edge point data are compared to determine which of the orientation data matches the work article data.

Since the time required for processing the edge point data information has been a factor limiting the speed at which the conveyor 12 may operate, various efforts have been made in the past to reduce the processing time to allow faster classification of objects by the computer. One previous approach has been to have the operator manually set areas of interest with a keyboard, a mouse, or the like. By the present invention, the computer automatically locates the areas of maximum difference between the stored object information data and the collective article information data without the need for operator participation.

Reference is made to FIG. 2 which shows a flow chart for generating the windows that correspond to numbered slice scans for a specific article whose orientation is to be determined.

The procedure illustrated in FIG. 2 will be described in connection with an article that may have four orientations that must be separately ascertained. The program is capable of detecting up to seven orientations as described above. The four orientations A, B, C, and D are shown in FIG. 3. Before starting the program, the orientations are stored just as described in the prior '493 patent.

With the use of the program of FIG. 2, the scan slices 2-999 where maximum deviation between the marginal edges that are presented in the several orientations are identified. The article has an arbitrary length of 1000 scan slices that are oriented along the X axis. The article height is arbitrarily designated to be 400 along the Y axis. The thickness of the parts of the article is assumed to be 100 units as measured along the Y axis.

With continued reference to FIG. 2, the process is initialized by setting a first loop counter A to zero at step 102. At step 104, the counter is incremented and connected to the register where the orientation A data is stored. At steps 106 and 108, the leading edge and the trailing edge scan slices corresponding to X axis positions of 1 and 1000 in FIG. 3 are stored. This corresponds to scan slices 1 and 1000 assuming that a three inch article will be sequentially scanned a thousand times as it passes the sensor 30 of FIG. 1. In this embodiment, scan slices 1 and 1000 are always stored. At step 110 in FIG. 2, orientation A stored information is retrieved.

At step 112, a second loop counter B is set to zero and incremented at step 114 to a position for an iteration with respect to orientation A data collected at step 110. Iteration completes learned data of orientation A with learned data of orientation A by starting with scan slice 2 of both orientation A and orientation A data. The number of differences in this pixel data at scan slice 2 for orientation A and orientation A is determined and is called a score. The same procedure is followed for scan slices 3 through 999. In all, 998 scores are determined at step 116.

At step 118, the maximum score is determined should be zero, also same value less than 10 may be maximum score and its scan slice number is stored as a window. While a reading from only one window is theoretically sufficient to determine that a Dart orientation does not match a stored known orientation, in practice several slice numbers, for example up to about 20, may be stored where the scores are the largest to reduce the likelihood of ambiguity in the results. This determination is made at step 126.

Orientation A data is then compared with orientation B data in the same manner and a new maximum difference at a new slice scan location is generated. This slice scan number is stored as a second window. Another signal on lead 124 increments loop counter B at step 114 to receive orientation C data after which the slice number for a third window is generated. The loop counter B at step 114 continues incrementing until B is equal to the number of orientations stored.

At step 126, a determination is made as to whether a sufficient number of windows has been generated. If not, the same procedure is repeated If "yes" the procedure advances to step 130 to determine whether counter A is equal to the total number of orientations that have been learned. In this example, stored information corresponding to orientations B, C and D must be compared with all of the learned orientation data before this program is completed. At that time orientations A, B, C and D will each have been individually compared with stored orientation data for the same orientations A, B, C and D.

At the end of the setting-up procedure, at least 12 scan slice numbers will be identified as windows since each of the four article orientations will have three maximum differences which each produce three windows. Some of the windows appear at the same scan slice.

Turning to FIG. 3, windows are established by the program of FIG. 2 without operator selection at counts 99, 199, 799 and 899. These are the windows of importance for article orientation determination in the specific example here being described.

Once the windows have been identified, it has been found useful to expand each window to have a width of three or five scan slices centered about the scan slice. Thus, widening of a window compensates for possible data misalignments which can occur in some systems due to mechanical wear and other changes which occur during a continuous operation over several weeks.

After the windows are generated as a setting operation, work articles are fed past scanner 30 to identify edge points on the article profile. A comparison operates in real time to determine article orientation during an interval that corresponds to the interval between successive work articles on the conveyor.

When a work article is moved past sensor 30 of FIG. 1 which has an orientation A as shown in FIG. 3, a comparison of the work article profile data with each of the learned orientations A, B, C and D is made at the windows previously selected by the program of FIG. 2. Comparing the work article orientation A profile data with stored orientation A data gives a total score of zero. A similar comparison of the same work article data with the stored orientation B data gives a score of 300 at each of the four windows 99, 199, 799 and 899 to thereby produce a total score of 1200. The same comparison with the stored orientation C data gives a total score of 400 and with the orientation D data gives a total score of 1000.

From FIG. 3 it can be seen that regardless of which orientation the work article assumes, one stored orientation match with a score at or near zero will be obtained and the orientation of the work article thereby recognized. Where each window is three or five scan slices wide, the score for orientation mismatches increases while remaining essentially at zero for the actual orientation. The results obtained with a comparison of only four or up to about twenty windows along the length of a three inch article can be accomplished with less memory and less time than where all pixel information is processed while at the same time the performance is fully as reliable. Where the high resolution system disclosed in the companion co-pending applications is used, even greater speeds can be obtained which can allow a greater number of articles to be processed per unit time.

While only a single embodiment has been illustrated, it is apparent that changes and modifications will be apparent to those skilled in this art. All such modifications and changes which fall within the scope of the claims and equivalents thereof are intended to be covered thereby.

We claim:

1. In a method for determining orientation of singulated articles on a conveyor by sensing article orientation with an array of optical sensors effective to provide information data relating to a pattern of article edge points via successive linear scans of said article the steps comprising:

during a setting-up procedure;
a) storing image edge point data for a plurality of predetermined possible article orientations;
b) determining a maximum data difference between each pair of possible orientations based on image edge point data stored in step a; and
c) identifying at least one linear scan of the article which corresponds to a maximum image edge point data difference between each different pair of orientations;

during a running procedure;
d) acquiring image edge point data from singulated work articles which is compared with the stored image edge point data at each of said maximum image edge point data identified in step "b" hereof; and
(e) determining an orientation mismatch of the work article orientation and the stored article orientation if the image edge point data difference between said stored image edge point data and said scan image edge point data identified in step "b" hereof is greater than or less than a predetermined value; and
f) determining a plurality of linear scans of image edge point data along the article length where major differences occur for each of the possible orientations; and
g) totaling the sum of the difference at each of said plurality of linear scans of image edge point data determined in step "f" hereof; and
using said sum of differences for identifying work article orientation.

2. The method of claim 1 wherein the plurality of linear scans of image edge point data is at least four linear scans and less than about ten percent of the total number of possible linear scans of image edge point data.

3. The method of claim 2 including a further step during the setting-up procedure of expanding the linear scan from one scan to include not more than about two adjacent scans on each side of an image edge point data position.

4. In a method for determining orientation of work articles transported past a sensing station by comparison of profile data obtained by sequentially scanning each article at spaced positions along the article length as the article moves at a constant speed to form sequential scan slices with each of said sequential scan slices having article edge point information data, the steps of: during a setting-up procedure
   a) supplying to a memory scan slice information data relating to part geometry for a plurality of different part orientations A and B by data accumulated as the article is transported past said sensing station in orientations A and B thereby to provide learned information data;
   b) determining a first sequential number of said scan slice when a maximum difference exists between article edge points when orientation A is compared with orientation B;
   c) determining a second sequential number of said scan slice when a maximum difference exists between article edge point information data when orientation B is compared with orientation A;
   d) storing sequential scan slice numbers as numbered windows; thereafter making an orientation determination by:
   e) moving singulated work articles past said sensing station;
   f) sequentially scanning each work article to form sequential scan slices having article edge point information data at each sequential scan slice;
   g) subtracting article edge point information data from learned information data only at said numbered windows to produce a score relating to a difference corresponding to each window location for each of the possible orientations sequentially, whereby the lowest score is used to identify the work article orientation.

5. In a method for determining orientation of work articles transported past a sensing station by comparison of profile data obtained by sequentially scanning each article at spaced positions along the article length as the article moves at a constant speed to form sequential scan slices with each of said sequential scan slices having article edge point information data, the steps of:
   during a setting procedure
   a) supplying to a memory, scan slice information data relating to part geometry for a plurality of different part orientations A, B and C by data accumulated as the article is transported past said sensing station in orientations A, B and C thereby to provide learned information data;
   b) determining sequential scan slice members where a maximum difference exists between article edge points when orientation A is compared with orientation B and with orientation C, respectively;
   c) determining two additional sequential scan slice numbers where a maximum difference exists between article edge points when orientation B is compared with orientation A and with orientation C, respectively;
   d) determining two additional sequential scan slice numbers where a maximum difference exists between article edge points when orientation C is compared with orientation A and with orientation B, respectively;
   e) storing all six of said sequential scan slice numbers as numbered windows; thereafter making an orientation determination by:
   f) moving singulated work articles past said sensing station;
   g) sequentially scanning each work article to form scan slices having article edge point information data at least where each scan slice window occurs; and
   h) subtracting article edge point information data from learned information data only at said numbered windows to produce a score relating to a difference corresponding to each window location;
   i) totaling the scores produced by subtracting work article information data from learned information data at said numbered windows for each of the three orientations, and
   j) utilizing the lowest score to identify the work article orientation.

* * * * *